United States Patent
Faxér et al.

(10) Patent No.: US 11,310,010 B2
(45) Date of Patent: Apr. 19, 2022

(54) HYBRID-SRS COMBINATION SIGNALING

(71) Applicant: Telefonaktiebolaget LM Ericsson (publ), Stockholm (SE)

(72) Inventors: Sebastian Faxér, Järfälla (SE); Fredrik Athley, Kullavik (SE); Mattias Frenne, Uppsala (SE); Virgile Garcia, Antibes (FR); Andreas Nilsson, Gothenburg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/476,616

(22) PCT Filed: Dec. 29, 2017

(86) PCT No.: PCT/IB2017/058524
§ 371 (c)(1),
(2) Date: Jul. 9, 2019

(87) PCT Pub. No.: WO2018/127781
PCT Pub. Date: Jul. 12, 2018

(65) Prior Publication Data
US 2019/0372732 A1  Dec. 5, 2019

Related U.S. Application Data

(60) Provisional application No. 62/444,128, filed on Jan. 9, 2017.

(51) Int. Cl.
*H04W 88/08* (2009.01)
*H04L 5/00* (2006.01)
(Continued)

(52) U.S. Cl.
CPC ......... *H04L 5/0048* (2013.01); *H04B 7/0456* (2013.01); *H04B 7/0639* (2013.01); *H04L 27/2601* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 8,462,879 B2 * | 6/2013 | Dybdal | H01Q 21/26 375/295 |
| 2010/0075706 A1 * | 3/2010 | Montojo | H04B 7/0691 455/513 |

(Continued)

FOREIGN PATENT DOCUMENTS

| | | |
|---|---|---|
| CN | 102859892 | 1/2013 |
| CN | 105745975 | 7/2016 |

(Continued)

OTHER PUBLICATIONS

PCT Notification of Transmittal of the International Preliminary Report on Patentability for International application No. PCT/IB2017/058524—dated Mar. 22, 2019.

(Continued)

*Primary Examiner* — Sithu Ko
(74) *Attorney, Agent, or Firm* — Baker Botts, LLP

(57) ABSTRACT

Some embodiments include a method in a wireless device capable of uplink transmission in a wireless communication network. The wireless device comprises a plurality of antenna ports. The method comprises determining one or more subsets of the plurality of antenna ports. Each subset of antenna ports comprises antenna ports that can be coherently combined to form a precoding of a transmission layer for transmitting from the subset of antenna ports. The method further comprises communicating an indication of the one or more subsets to a network node, and receiving, from the network node, an instruction of a precoding to use for an uplink transmission. The instruction is based on the indicated one or more subsets. The method further com- (Continued)

prises precoding an uplink transmission based on the received instruction, and transmitting the transmission to the network node.

24 Claims, 10 Drawing Sheets

(51) Int. Cl.
*H04B 7/0456* (2017.01)
*H04B 7/06* (2006.01)
*H04L 27/26* (2006.01)
*H04W 72/04* (2009.01)

(56) References Cited

U.S. PATENT DOCUMENTS

| | | | | |
|---|---|---|---|---|
| 2012/0213113 | A1* | 8/2012 | Zhao | H04W 24/10 370/252 |
| 2013/0039235 | A1* | 2/2013 | Rahman | H04B 7/0665 370/280 |
| 2014/0286202 | A1* | 9/2014 | Song | H04B 7/01 370/278 |
| 2015/0195071 | A1* | 7/2015 | Lunttila | H04L 5/0053 370/329 |
| 2016/0007340 | A1* | 1/2016 | Park | H04B 7/0626 370/329 |
| 2016/0288521 | A1* | 10/2016 | Araki | B41J 2/19 |
| 2016/0337056 | A1 | 11/2016 | Frenne et al. | |
| 2017/0141893 | A1* | 5/2017 | Zhang | H04W 72/042 |
| 2018/0062724 | A1* | 3/2018 | Onggosanusi | H04B 7/0413 |
| 2018/0091207 | A1* | 3/2018 | Kakishima | H04B 7/0626 |
| 2020/0007201 | A1* | 1/2020 | Liu | H04L 25/0226 |
| 2020/0099490 | A1* | 3/2020 | Sridharan | H04L 5/0048 |
| 2020/0204224 | A1* | 6/2020 | Kang | H04L 5/0094 |

FOREIGN PATENT DOCUMENTS

| | | |
|---|---|---|
| WO | 2016 018100 A1 | 2/2016 |
| WO | 2016 065557 A1 | 5/2016 |
| WO | WO 2016070391 | 5/2016 |
| WO | WO2016114696 A1 | 7/2016 |

OTHER PUBLICATIONS

PCT Written Opinion of the International Searching Authority for International application No. PCT/IB2017/058524—dated Apr. 23, 2018.

PCT International Search Report for International application No. PCT/IB2017/058524—dated Apr. 23, 2018.

3GPP TSG-RAN WG1 #87; Reno, Nevada, USA; Source: Qualcomm Incorporated; Title: View on SRS (R1-1612049)—Nov. 14-18, 2016.

Government of India Patent Office Examination Report in India Patent Application No. 201947031057 dated Dec. 29, 2020, 8 pages (translated).

China Patent Office, Office Action dated Apr. 21, 2021 in Application No. 2017800834293 (with translation).

Japan Patent Office, Official Action in JP Patent Application 2019-536135 dated Oct. 16, 2020 (with translation).

* cited by examiner

HYBRID-SRS COMBINATION SIGNALING

PRIORITY

This nonprovisional application is a U.S. National Stage Filing under 35 U.S.C. § 371 of International Patent Application Serial No. PCT/IB2017/058524 filed Dec. 29, 2017 and entitled "Hybrid-SRS Combination Signaling" which claims priority to U.S. Provisional Patent Application No. 62/444,128 filed Jan. 9, 2017 both of which are hereby incorporated by reference in their entirety.

TECHNICAL FIELD

Particular embodiments are directed to wireless communications and, more particularly, to signaling to a network node which antenna ports a wireless device can combine for transmitting a sounding reference signal (SRS).

BACKGROUND

Various embodiments and examples may be described herein using Third Generation Partnership Project (3GPP) New Radio (NR) terminology. The embodiments, however, are equally applicable to other wireless communication systems and standards such as long term evolution (LTE). For example, several embodiments and examples describe a transmission between a User Equipment (UE) and a gNodeB (gNB), using 3GPP NR terminology, but the embodiments and examples are applicable to other wireless devices or networks nodes as well.

Multi-antenna techniques can significantly increase the data rates and reliability of a wireless communication system. The performance of the communication system is particularly improved if both the transmitter and the receiver are equipped with multiple antennas, which results in a multiple-input multiple-output (MIMO) communication channel. Such systems and/or related techniques are commonly referred to as MIMO.

A core component in NR is the support of MIMO antenna deployments and MIMO related techniques. NR may support up to 4 or 8-layer spatial multiplexing for up to 8 antenna ports in the uplink (UL) with channel dependent precoding. The spatial multiplexing mode is targeted for use with high data rates in favorable channel conditions. An illustration of the spatial multiplexing operation for OFDM is provided in FIG. 1.

FIG. 1 is a block diagram illustrating the transmission structure of precoded spatial multiplexing in New Radio (NR). The information carrying symbol vector s is multiplied by a $N_T \times r$ precoder matrix W, which serves to distribute the transmit energy in a subspace of the $N_T$ (corresponding to $N_T$ (DMRS) antenna ports) dimensional vector space. The precoder matrix is typically selected from a codebook of possible precoder matrices, and is typically indicated by means of a precoder matrix indicator (PMI). The PMI specifies a unique precoder matrix in the codebook for a given number of symbol streams. The r symbols in s each correspond to a layer and r is referred to as the transmission rank. The result is spatial multiplexing because multiple symbols can be transmitted simultaneously over the same time/frequency resource element (TFRE). The number of symbols r is typically adapted to suit the current channel properties.

NR uses either orthogonal frequency division multiplexing (OFDM) or DFT-spread OFDM in the uplink (DFT-spread OFDM is only used for single layer transmission). Thus, the received $N_R \times 1$ vector $y_n$ for a certain TFRE on subcarrier n (or alternatively data TFRE number n) is modeled by $$y_n = H_n W s_n + e_n \qquad \text{Equation 1}$$

where $e_n$ is a noise/interference vector obtained as realizations of a random process. The precoder W may be a wideband precoder, which is constant over frequency, or frequency selective.

The precoder matrix W is often chosen to match the characteristics of the $N_R \times N_T$ MIMO channel matrix $H_n$, which may be referred to as channel dependent precoding or also commonly referred to as closed-loop precoding. Channel dependent precoding attempts to focus the transmit energy into a subspace which is strong in the sense of conveying much of the transmitted energy to the gNB. In addition, the precoder matrix may be selected to orthogonalize the channel, meaning that after proper linear equalization at the gNB, the inter-layer interference is reduced.

One example method for a gNB to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 1}$$

where $\hat{H}_n$ is a channel estimate, possibly derived from a sounding reference signal (SRS) transmitted by the UE as described further below; $W_k$ is a hypothesized precoder matrix with index k; and $\hat{H}_n W_k$ is the hypothesized equivalent channel.

In closed-loop precoding for the NR uplink, the gNB transmits to the UE, based on channel measurements in the uplink, a recommendation of a suitable precoder to use. A single precoder that is supposed to cover a large bandwidth (wideband precoding) may be fed back. It may also be beneficial to match the frequency variations of the channel and instead feed back a frequency-selective precoding report (e.g., several precoders, one per subband). This is an example of the more general case of channel state information (CSI) feedback, which encompasses feeding back other information in addition to the recommended precoders to assist the UE in subsequent transmissions to the gNB. The other information may include channel quality indicators (CQIs) and a transmission rank indicator (RI).

Given the CSI feedback from the gNB, the UE is instructed with the transmission parameters it should use to transmit to the gNB, including the precoding matrix, transmission rank, and modulation and coding state (MCS). At least the precoding matrix may differ from the recommendation the gNB makes, as the demodulation reference signals (DMRS) in the uplink are precoded with the same precoding matrix as the PUSCH/PUCCH and therefore is transparent to the gNB. The transmission rank, and thus the number of spatially multiplexed layers, is reflected in the number of columns of the precoder W. For efficient performance, selecting a transmission rank that matches the channel properties is important.

UEs can be equipped with multiple antennas and multiple transmit and receive units (TXRUs) to enable MIMO transmissions in the uplink. Each of these TXRUs contains the hardware to independently transmit/receive signals, including the Power Amplifiers (PAs).

The baseband of a UE can control different antenna or antenna element groupings, and the number of digital TRXUs path defines how many parallel streams the baseband can handle. The "baseband port" is the interface between the baseband chain and an antenna arrangement. One baseband port is thus associated with one TXRU (including a PA) and one antenna arrangement. Hereinafter, "baseband port", "TXRU" and "PA" is used interchangeably when relating to the mapping to the SRS ports.

An uplink reference signal, the Sounding Reference Signal (SRS), is transmitted by the UE and received by the gNB to determine the channel quality between the UE and the gNB. When the UE support multiple SRSs, each SRS is associated with its respective SRS port.

The SRS port is not necessarily a one-by-one mapping with the baseband ports and may include various combinations of TXRUs. An example is illustrated in FIG. 2.

FIG. 2 is a block diagram illustrating Sounding Reference Signal (SRS) to baseband port mapping. A wireless device includes SRS ports 12 and baseband ports 14. SRS port 12a is mapped to baseband ports 14a and 14b. SRS port 12b is mapped to baseband port 14d.

A mapping between the physical baseband antenna ports and the logical SRS antenna ports used for transmitting the reference signals may be referred to as an antenna port virtualization, and may be described by a size $N_B \times N_T$ virtualization matrix F, where $N_B$ is the number of baseband ports and $N_T$ is the number of SRS antenna ports. The antenna port virtualization is thus a linear mapping between the baseband ports and the SRS ports. If the channel matrix between the UEs baseband ports and the gNBs receive antennas is $H_B$, then the effective channel between the UEs (logical) SRS ports and the gNBs receive antennas is $H=H_B F$. A mapping between SRS ports to baseband ports is performed to configure the MIMO capabilities of the UE. For example, the number of layers for spatial multiplexing cannot exceed the number of SRS ports.

One way of handling mobility and beam management is to use multiple time scales for the configuration of different parameters, such as the number or SRS ports or the SRS port virtualization, depending on the dynamicity of the parameter tuned. As the channel depends on the configuration, it is not recommended to change the mapping or combining weights of the SRS virtualization too often, because it results in renewing measurements and possibly signaling of new configurations.

FIG. 3 is a diagram illustrating a general time scale for beamforming management. As illustrated, link adaptation is generally performed on a time scale of 1 ms to 10 ms. Beam management is generally performed on a time scale of 10 ms to 1 s. SRS port configuration is generally performed on a time scale of greater than 1 s.

The examples described herein include more than one SRS port (i.e., a set of SRS ports). The number of SRS ports is, as described above, not necessarily the same as the number of baseband ports. Using a smaller number of SRS ports than the number of baseband ports/TXRUs available helps to reduce the complexity of the UE, reduce the number of SRS transmissions (which may result in a reduction of interference and possibly a concentration of transmit power to fewer directions), and realize advantages of beamforming (directivity gains) which can help increase the coverage of the SRS transmission.

Several strategies may be used when determining the SRS port virtualization, which include: (a) Non-precoded SRS ports: No SRS ports within the set share the same TXRU; (b) Precoded SRS ports: Each SRS port within the set shares at least one TXRU with another SRS port; and (c) Hybrid SRS ports: The SRS ports are divided into subsets where each SRS port within a subset shares at least one TXRU with another SRS port in the subset and where no SRS ports from different subsets share any TXRU.

SUMMARY

The embodiments described herein include establishing an understanding between a wireless device, such as a user equipment (UE), and a network node, such as a gNB, about which sounding reference signal (SRS) ports may be used for precoding to form a transmission of a precoded layer. In some embodiments, using explicit feedback the UE reports which antenna ports are compatible to be combined, as an additional overhead. In some embodiments, using implicit feedback the UE transmits the SRS in a manner that the gNB knows, through a predetermined arrangement, which SRS ports are compatible to be combined with each other.

Some embodiments include a method in a wireless device capable of uplink transmission in a wireless communication network. The wireless device comprises a plurality of antenna ports. The method comprises determining one or more subsets of the plurality of antenna ports. Each subset of antenna ports comprises antenna ports that can be coherently combined to form a precoding of a transmission layer for transmitting from the subset of antenna ports. The method further comprises communicating an indication of the one or more subsets to a network node, and receiving, from the network node, an instruction of a precoding to use for an uplink transmission. The instruction is based on the indicated one or more subsets. The method further comprises precoding an uplink transmission based on the received instruction, and transmitting the transmission to the network node.

In particular embodiments, the indication of the one or more subsets indicates which antenna ports are combinable or which antenna ports are not combinable. The indication of the one or more subsets may indicate allowable precoders of a codebook or unallowable precoders of a codebook.

In particular embodiments, communicating the indication of the one or more subsets comprising sending, to the network node, a radio resource control (RRC) message that includes the indication. The instruction of the precoding to use for the uplink transmission may comprise a codebook selection.

According to some embodiments, a wireless device is capable of uplink transmission in a wireless communication network. The wireless device comprises a plurality of antenna ports, and processing circuitry operable to determine one or more subsets of the plurality of antenna ports. Each subset of antenna ports comprises antenna ports that can be coherently combined to form a precoding of a transmission layer for transmitting from the subset of antenna ports. The processing circuitry is further operable to communicate an indication of the one or more subsets to a network node, and receive, from the network node, an instruction of a precoding to use for an uplink transmission. The instruction is based on the indicated one or more subsets. The processing circuitry is further operable to precode an uplink transmission based on the received instruction, and transmit the transmission to the network node.

In particular embodiments, the indication of the one or more subsets indicates which antenna ports are combinable or which antenna ports are not combinable. The indication of the one or more subsets may indicate allowable precoders of a codebook or unallowable precoders of a codebook.

In particular embodiments, the processing circuitry is operable to communicate the indication of the one or more subsets by sending, to the network node, a RRC message that includes the indication. The instruction of the precoding to use for the uplink transmission may comprise a codebook selection.

Some embodiments include a method in a network node capable of receiving an uplink transmission in a wireless communication network from a wireless device comprising a plurality of antenna ports. The method comprises receiving, from the wireless device, an indication of one or more subsets of the plurality of antenna ports. Each subset of antenna ports comprises antenna ports that can be coherently combined to form a precoding of a transmission layer for transmitting from the subset of antenna ports. The method further comprises determining a precoding for the wireless device to use for an uplink transmission based on the received indication, and sending an instruction to use the determined precoding to the wireless device.

In particular embodiments, the indication of the one or more subsets indicates which antenna ports are combinable or which antenna ports are not combinable. The indication of the one or more subsets may indicate allowable precoders of a codebook or unallowable precoders of a codebook.

In particular embodiments, receiving the indication comprises receiving a RRC message. The instruction to use the precoding for the uplink transmission may comprise a codebook selection.

According to some embodiments, a network node is capable of receiving an uplink transmission in a wireless communication network from a wireless device comprising a plurality of antenna ports. The network node comprises processing circuitry operable to receive, from the wireless device, an indication of one or more subsets of the plurality of antenna ports. Each subset of antenna ports comprises antenna ports that can be coherently combined to form a precoding of a transmission layer for transmitting from the subset of antenna ports. The processing circuitry is further operable to determine a precoding for the wireless device to use for an uplink transmission based on the received indication, and send an instruction to use the determined precoding to the wireless device.

In particular embodiments, the indication of the one or more subsets indicates which antenna ports are combinable or which antenna ports are not combinable. The indication of the one or more subsets may indicate allowable precoders of a codebook or unallowable precoders of a codebook.

In particular embodiments, the processing circuitry is operable to receive the indication by receiving a RRC message. The instruction to use the precoding for the uplink transmission may comprise a codebook selection.

According to some embodiments, a wireless device capable of uplink transmission in a wireless communication network comprises a plurality of antenna ports, a determining module, a transmitting module, a precoding module, and a receiving module. The determining module is operable to determine one or more subsets of the plurality of antenna ports. Each subset of antenna ports comprises antenna ports that can be coherently combined to form a precoding of a transmission layer for transmitting from the subset of antenna ports. The transmitting module is operable to communicate an indication of the one or more subsets to a network node. The receiving module is operable to receive, from the network node, an instruction of a precoding to use for an uplink transmission, the instruction based on the indicated one or more subsets. The precoding module is operable to precode an uplink transmission based on the received instruction. The transmitting module is further operable to transmit the transmission to the network node.

According to some embodiments, a network node is capable of receiving an uplink transmission in a wireless communication network from a wireless device comprising a plurality of antenna ports. The network node comprises a receiving module, a determining module, and a transmitting module. The receiving module is operable to receive, from the wireless device, an indication of one or more subsets of the plurality of antenna ports. Each subset of antenna ports comprises antenna ports that can be coherently combined to form a precoding of a transmission layer for transmitting from the subset of antenna ports. The determining module is operable to determine a precoding for the wireless device to use for an uplink transmission based on the received indication. The transmitting module is operable to send an instruction to use the determined precoding to the wireless device.

Also disclosed is a computer program product. The computer program product comprises instructions stored on non-transient computer-readable media which, when executed by a processor, perform the step of determining one or more subsets of the plurality of antenna ports. Each subset of antenna ports comprises antenna ports that can be coherently combined to form a precoding of a transmission layer for transmitting from the subset of antenna ports. The instructions further perform the steps of communicating an indication of the one or more subsets to a network node, and receiving, from the network node, an instruction of a precoding to use for an uplink transmission. The instruction is based on the indicated one or more subsets. The instructions further perform the step of precoding an uplink transmission based on the received instruction, and transmitting the transmission to the network node.

Another computer program product comprises instructions stored on non-transient computer-readable media which, when executed by a processor, perform the step of receiving, from the wireless device, an indication of one or more subsets of the plurality of antenna ports. Each subset of antenna ports comprises antenna ports that can be coherently combined to form a precoding of a transmission layer for transmitting from the subset of antenna ports. The instructions further perform the steps of determining a precoding for the wireless device to use for an uplink transmission based on the received indication, and sending an instruction to use the determined precoding to the wireless device.

An advantage of particular embodiments is that a gNB can properly schedule the uplink multiple-input multiple-output (MIMO) transmissions using the UE's transmissions ports/TXRU. Providing feedback instead of fixed predefined possibilities offers more flexibility to UE manufacturers and UE dynamic configurations. The implicit feedback also facilitates a UE providing such information without extra signaling overhead

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
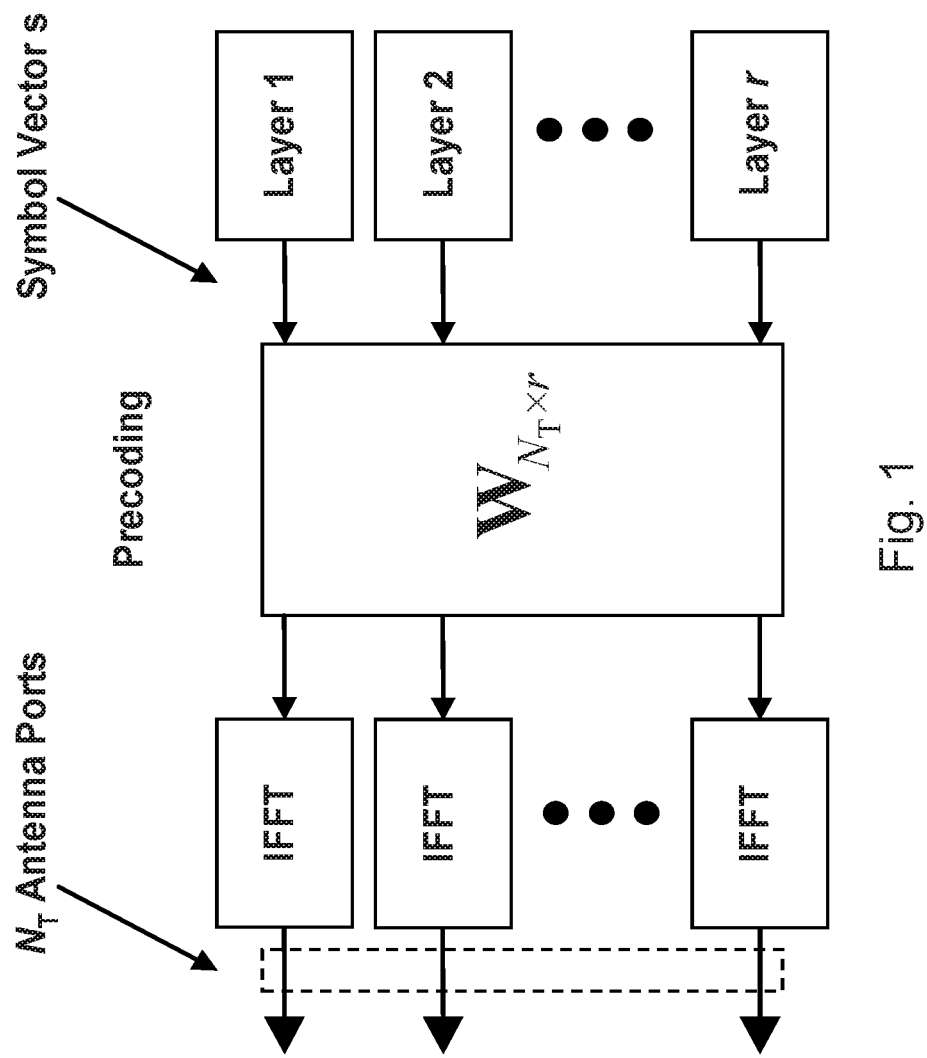
FIG. 1 is a block diagram illustrating the transmission structure of precoded spatial multiplexing in New Radio (NR)
Figure 2:
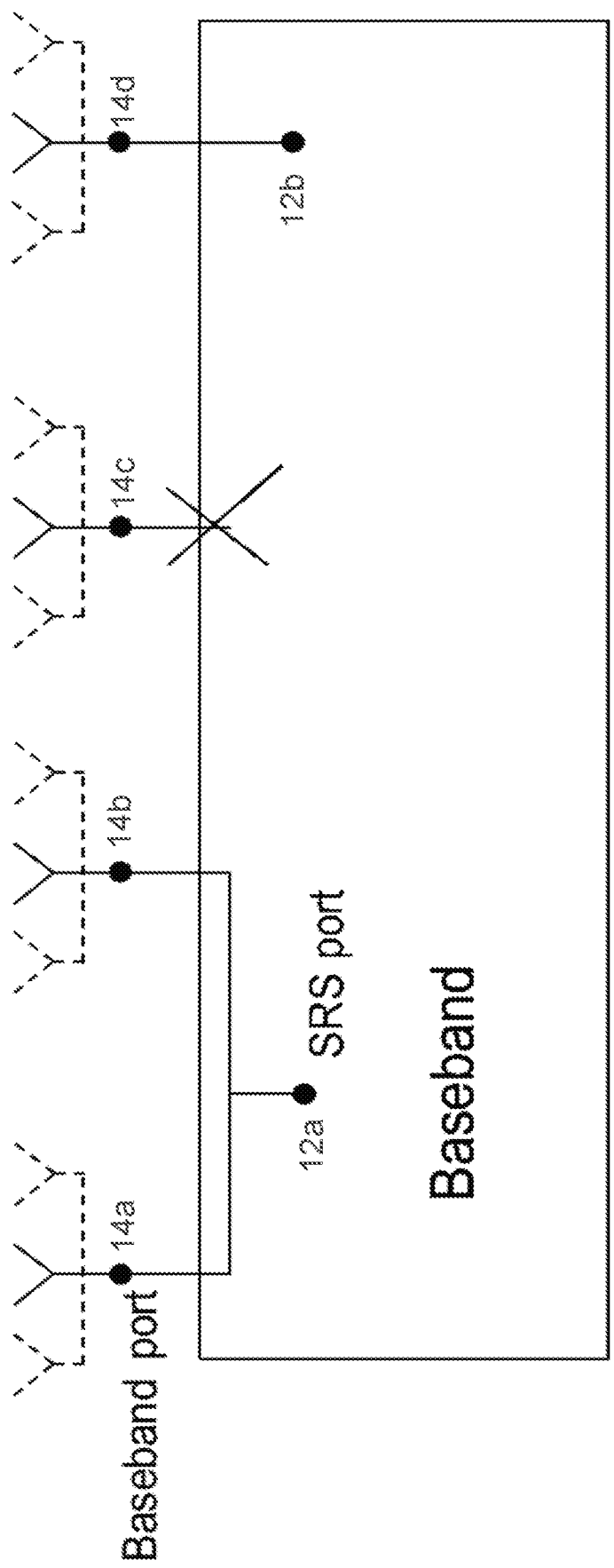
FIG. 2 is a block diagram illustrating Sounding Reference Signal (SRS) to baseband port mapping.

Third Generation Partnership Project (3GPP) includes specifications for a new radio access technology (NR) for fifth generation (5G) networks. As described in the Introduction, multi-antenna techniques can significantly increase the data rates and reliability of a wireless communication system (e.g., multiple-input multiple-output (MIMO)).

MIMO may include precoded spatial multiplexing. The precoder matrix is typically selected from a codebook of possible precoder matrices, and is typically indicated by means of a precoder matrix indicator (PMI). The PMI specifies a unique precoder matrix in the codebook for a given number of symbol streams.

The precoder matrix is often chosen to match the characteristics of the MIMO channel matrix, which may be referred to as channel dependent precoding or also commonly referred to as closed-loop precoding. In addition, the precoder matrix may be selected to orthogonalize the channel, meaning that after proper linear equalization at the gNB, the inter-layer interference is reduced.

In closed-loop precoding for the NR uplink, the gNB transmits to the UE, based on channel measurements in the uplink, an instruction or recommendation of a suitable precoder to use. A single precoder that is supposed to cover a large bandwidth (wideband precoding) may be fed back. It may also be beneficial to match the frequency variations of the channel and instead feed back a frequency-selective precoding report (e.g., several precoders, one per subband). This is an example of the more general case of channel state information (CSI) feedback, which encompasses feeding back other information in addition to the recommended precoders to assist the UE in subsequent transmissions to the gNB. The other information may include channel quality indicators (CQIs) and a transmission rank indicator (RI).

Given the CSI feedback from the gNB, the UE is instructed with the transmission parameters it should use to transmit to the gNB, including the precoding matrix, transmission rank, and modulation and coding state (MCS). For efficient performance, selecting a transmission rank that matches the channel properties is important.

UEs can be equipped with multiple antennas and multiple transmit and receive units (TXRUs) to enable MIMO transmissions in the uplink. Each of these TXRUs contains the hardware to independently transmit/receive signals, including the Power Amplifiers (PAs). The baseband of a UE can control different antenna or antenna element groupings, and the number of digital TRXUs path defines how many parallel streams the baseband can handle.

An uplink reference signal, the Sounding Reference Signal (SRS), is transmitted by the UE and received by the gNB to determine the channel quality between the UE and the gNB. When the UE support multiple SRSs, each SRS is associated with its respective SRS port. The SRS port is not necessarily a one-by-one mapping with the baseband ports and may include various combinations of TXRUs. A mapping between SRS ports to baseband ports is performed to configure the MIMO capabilities of the UE.

Using a smaller number of SRS ports than the number of baseband ports/TXRUs available helps to reduce the complexity of the UE, reduce the number of SRS transmissions (which may result in a reduction of interference and possibly a concentration of transmit power to fewer directions), and realize advantages of beamforming (directivity gains) which can help increase the coverage of the SRS transmission.

Several strategies may be used when determining the SRS port virtualization, which include: (a) Non-precoded SRS ports: No SRS ports within the set share the same TXRU; (b) Precoded SRS ports: Each SRS port within the set shares at least one TXRU with another SRS port; and (c) Hybrid SRS ports: The SRS ports are divided into subsets where each SRS port within a subset shares at least one TXRU with another SRS port in the subset and where no SRS ports from different subsets share any TXRU.

One problem with shared TXRUs, specifically power amplifiers, is that precoding data over such ports leads to poor utilization of the power amplifiers when the number of layers is less than the number of TXRUs. In a worst case, applicable for a single layer, only one out of all the power amplifiers over which data is precoded may be in use. Expressed in another way, as little as 1/N (N=number of TXRU, all PA having the same max power) of the available output power may be used.

Another problem is that because the network is responsible for the transport format (rank selection, link adaptation, power control, etc.), not knowing how the SRSs are mapped to the TXRUs leads to unexpected power amplifier underutilization and potential performance loss. For example, the MCS may be set too aggressive and the transmission may not be correctly decoded.

Another problem is that each UE can have different SRS-to-port mapping. The different port mapping may be a result of UE design and capabilities such as number of PA, hardware paths between baseband, PA and antennas, etc., or specific situations such as mobility, channel conditions, network settings, etc., and the mapping may change over time. With so many possible configurations, standardizing the configurations is difficult.

Particular embodiments obviate the problems above and include either explicitly or implicitly signaling from a wireless device, such as a user equipment (UE) to a network node, such as a gNB, information that informs the gNB of the expected power utilization of different precoding hypotheses. Based on the information, the gNB may, in some embodiments, choose to reject certain precoding hypotheses which may result in poor power utilization at the UE and consequently be received with a relatively poor signal power at the gNB.

In certain embodiments, the signaling between a UE and a gNB comprises information corresponding to the SRS-to-Baseband port mapping of the UE (i.e., the SRS virtualization). The signaling is used to determine which precoding hypothesis may result in poor power utilization, because coherently combining precoded SRS ports that share the same TXRUs to form the transmission of a precoded layer may not be desirable, as discussed in the Introduction. Thus, particular embodiments inform the gNB which SRS antenna ports share the same TXRUs, so that these disadvantages may be avoided or accounted for. The following embodiments and examples may be described using uplink SRS as example, but the embodiments and examples could be extended to various reference signals. Some examples may determine a precoder based on power considerations, but other embodiments may determine a precoder or subset of precoders based on any suitable criteria for transmission of wireless signals.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc. The UE may also be referred to as a wireless device.

In some embodiments, generic terminology "network node" is used. It can be any kind of network node which may comprise of a radio network node such as base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., MME, SON node, a coordinating node, positioning node (e.g. SMLC, E-SMLC, etc.), MDT node, etc.), or even an external node (e.g., 3rd party node, a node external to the current network), etc.

Particular embodiments are described with reference to FIGS. 4-9B of the drawings, like numerals being used for like and corresponding parts of the various drawings. LTE and NR are used throughout this disclosure as example cellular systems, but the ideas presented herein may apply to other wireless communication systems as well.

Figure 4:
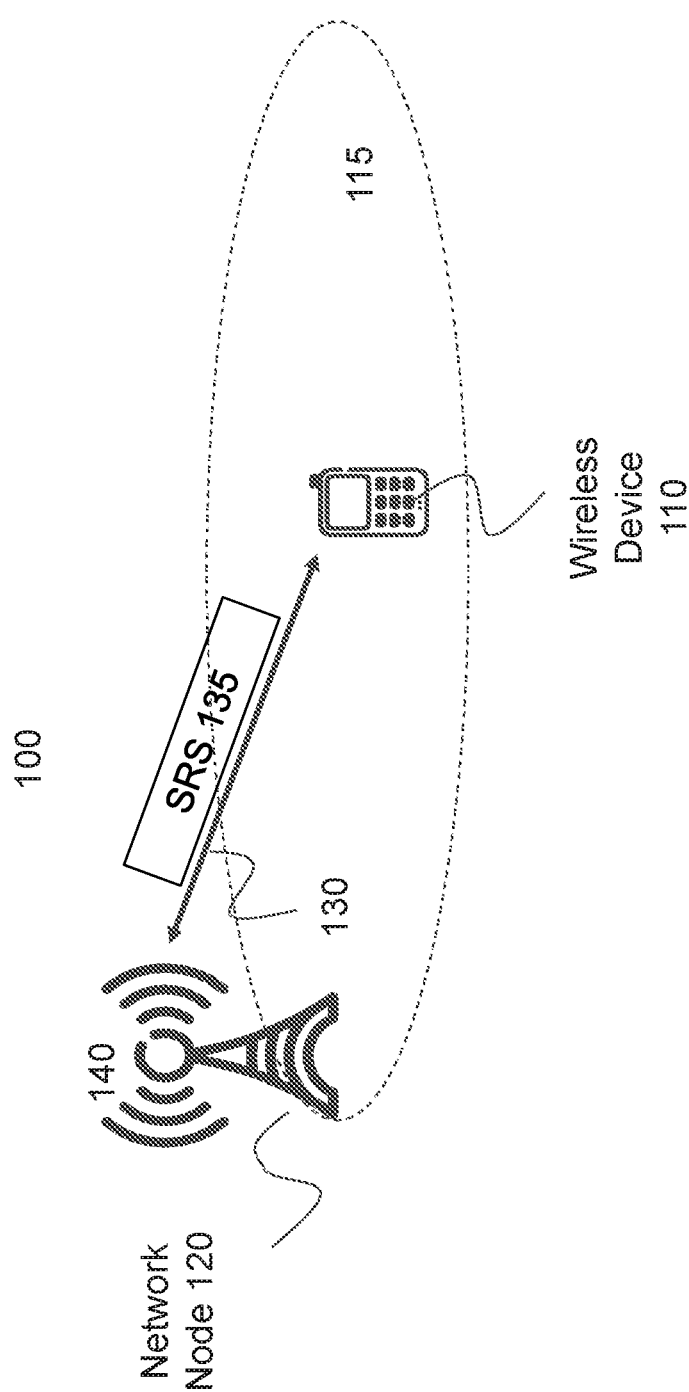
FIG. 4 illustrates an example wireless network, according to a particular embodiment.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic (e.g., broadcast video), and/or control signals. A network node 120 communicating voice traffic, data traffic, and/or control signals to wireless device 110 may be referred to as a serving network node 120 for the wireless device 110. Wireless signals 130 may include both downlink transmissions (from network node 120 to wireless devices 110) and uplink transmissions (from wireless devices 110 to network node 120).

Wireless signals 130 may include reference signals such as uplink sounding reference signal (SRS) 135. Particular embodiments may include additional reference signals.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, gNB, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Each network node 120 may have a single transmitter 140 or multiple transmitters 140 for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Wireless device 110 may transmit a reference signal, such as SRS 135, to network node 120 using multiple antennas. Wireless device 110 may map SRS 135 to one or more antenna ports.

In particular embodiments, wireless device 110 may determine one or more subsets of its plurality of antenna ports. Each subset of antenna ports comprises antenna ports that can be coherently combined to form a precoding of a transmission layer for transmitting from the subset of antenna ports. For example, in particular embodiments, wireless device 110 determines an indication of an expected power utilization of one or more precoding hypothesis as transmitted from a set of antenna ports wherefrom a set of reference signals, such as SRS 135, is transmitted by wireless device 110. Wireless device 110 may communicate, to network node 120, an indication of the subset of antenna ports. For example, wireless device 110 may communicate an indication of an expected power utilization.

Network node 120 may send wireless device 110 an instruction or recommendation of a precoding to use for an uplink transmission (e.g., PUSCH). The instruction or recommendation is based on the indicated subset of antenna ports. For example, the instruction or recommendation may be based on the expected power utilization of the subset of antenna ports. Wireless device 110 may precode an uplink transmission based on the received instruction or recommendation and transmit it to network node 120.

In particular embodiments, network node 120 receives, from wireless device 110, an indication of one or more subsets of the plurality of antenna ports that can be coherently combined to form a precoding of a transmission layer for transmitting from the subset of antenna ports. Network node 120 determines a precoding for the wireless device to use for an uplink transmission based on the received indication, and sends an instruction to use the determined precoding to wireless device 110. Additional description may be found below with respect to FIGS. 5-8.

In wireless network 100, each network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 9A. Similarly, a network node may include any suitable combination of hardware and/or software. For example, in particular embodiments, a network node, such as network node 120, may include the components described below with respect to FIG. 10A.

Particular embodiments include at least one of two options to feedback the possible combinations of ports from the wireless device to the network node. One option is implicit feedback and the other is explicit feedback. Each option is explained in more detail below.

In particular embodiments, the network node may store and update the possible combinations of SRS ports based on received or determined information. This information is specific for each wireless device and is valid until the wireless device changes its SRS-to-port mapping. In some embodiments, the signaling of the SRS-to-port mapping may benefit from being signaled in a dynamic fashion rather than being (semi)-statically signaled.

To keep track of which possible port combinations are allowed, the network node may, in some embodiments, save or store: (a) a full list of allowed port combinations (alternatively, a list of forbidden combinations); and/or (b) a binary table (or matrix) where the value at the (i,j) coordinates indicated if port i and j are allowed to be combined together within a layer. Some embodiments, instead of a binary value, may use a value indicating a power offset.

Regardless of how the network node chooses to represent the information, the network node may use the information about possible combinations to estimate the signal quality of the wireless device and select the precoding and transport format accordingly. An example is illustrated in FIG. 5.

Figure 5:
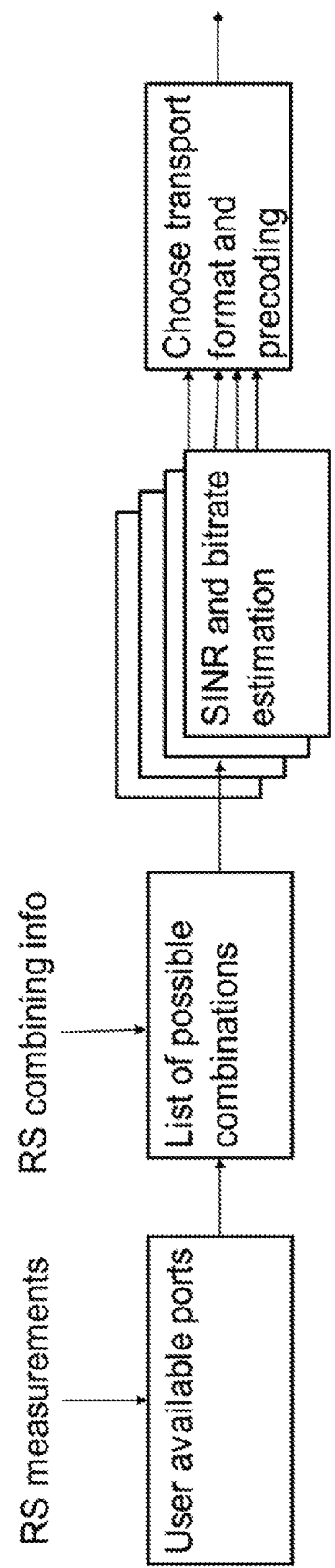
FIG. 5 is a flow diagram illustrating a method of selecting a precoding and transport format using information about possible antenna port combinations, according to some embodiments.

FIG. 5 is a flow diagram illustrating a method of selecting a precoding and transport format using information about possible antenna port combinations, according to some embodiments. The steps include measuring reference signals and determining available antenna ports. Of the available antenna ports, the wireless device or the network node determines which antenna ports may be combined for a particular reference signal, determines a SINR and bitrate estimation, and chooses a transport format and precoding.

The SRS to port mapping information known at one network node can be shared across the sectors, and nearby network nodes in the network. For example, they may be shared for coordinated transmissions (CoMP) or beam management purposes.

Knowing that some port combinations are not recommended or feasible, the network node can update its codebook specifically for each user. The following are examples of how to update:

Codebook Subset Restriction: The signaling indicates which precoders in the codebook are not allowed to be selected by the network node (e.g., if ports 1 & 3 (with indexing starting with 0) share TXRUs and this is indicated in the signaling, the precoder $$\begin{bmatrix} 1 & 1 \\ j & j \\ -1 & 1 \\ -j & j \end{bmatrix}$$

is forbidden while the precoder $$\begin{bmatrix} 1 & 1 \\ j & 0 \\ -1 & 1 \\ 0 & j \end{bmatrix}$$

is allowed. With this strategy, a rather large codebook with many precoders is defined in the standard and an (arbitrary) subset of allowed precoders is indicated via the SRS-to-port mapping signaling. Thus, the SRS-to-port mapping signaling is a way of compressing the Codebook Subset Restriction signaling (instead of signaling a bitmap with a bit indicating if each precoder is forbidden or not). The feedback overhead does not depend on the subset restriction (since this can be rather arbitrary) and so, the same feedback format can be used.

Codebook Selection: The signaling (implicitly) indicates which one out of several candidate codebooks should be used. Each candidate codebook corresponds to a certain SRS-to-port mapping. With this strategy, only a handful codebook candidates are defined in the standard, and the feedback formats may be optimized to the PMI payload of each codebook.

Port Power offset: The signaling indicates that a port power offset should be applied for precoder candidates. Port i and j are coherently combined into a single layer so that the CQI can be adapted to reflect the conditions of the actual transmission.

In some embodiments, the SRS sequence is transmitted using a specific structure that is the receiver recognizes. The SRS transmission structure can use the time and frequency domains to specify the possible port combinations. Thus, in these embodiments, the allowed port combinations are not explicitly signaled but rather conveyed implicitly via the configuration of SRS transmission.

Typically, the network node is in control of the SRS transmissions and instructs the wireless device where and how to transmit SRS. For example, the network node may use RRC to configure a periodic SRS transmission, or dynamically indicate an aperiodic SRS transmission in a Downlink Control Information (DCI) message transmitted on a Physical Downlink Control Channel (PDCCH).

However, in some embodiments, the wireless device may transmit additional information in the uplink, recommending how the network node should schedule SRS transmissions for the wireless device. For example, the wireless device may transmit an SRS configuration message indicating that it desires the forthcoming SRSs to be transmitted in a certain fashion (e.g., distributing the SRS antenna ports in a certain way on the time-frequency resource grid, or using certain comb offsets, cyclic shifts, or OCC-codes). Alternatively or additionally, the wireless device may transmit an SRS Scheduling Request Message, which may or may not be comprised within a Scheduling Request message for PUSCH transmission, indicating that it wants to transmit the SRS in a certain fashion for one or more specific SRS transmission occasions.

In particular embodiments, the receiver will assume that the SRS ports jointly transmitted on a given time slot can be jointly precoded for the transmission of a layer, while SRS ports transmitted using time multiplexing cannot. As a default behavior, ports that have not been transmitted within an SRS time slot will be assumed not allowed for combining.

In the precoded SRS mode, all the SRSs are sharing the same TXRUs, and so each SRS port transmits its SRS at different times. In the hybrid SRS mode, SRS are grouped into multiple sets. At each time, one SRS of each set may be transmitted. In the non-precoded SRS mode, SRSs do not share TXRUs and all the SRSs may thus be transmitted at the same time. Other embodiments may use frequency multiplexing in a similar manner for implicit signaling.

Figure 6:
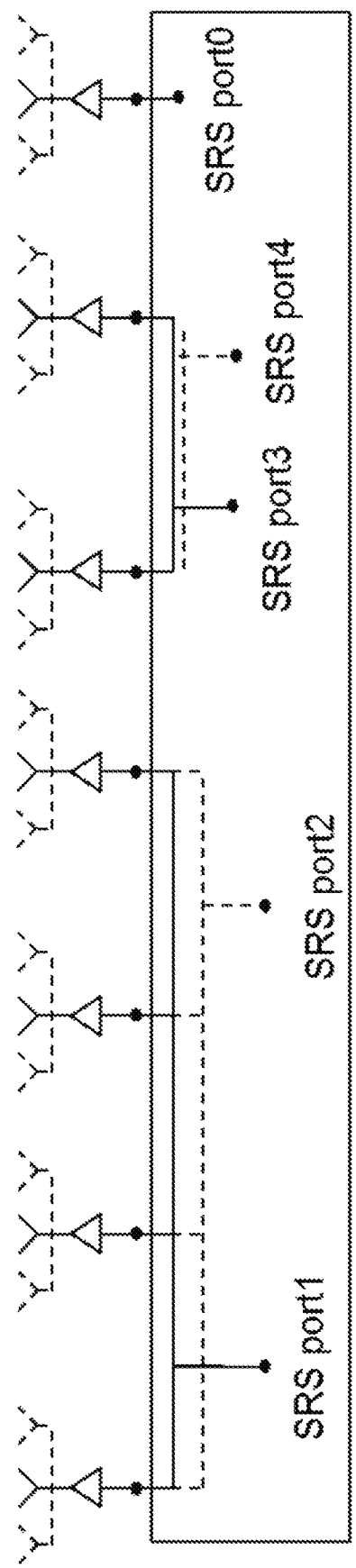
FIG. 6 is a block diagram illustrating an example of hybrid-SRS to antenna port mapping, according to some embodiments.

FIG. 6 is a block diagram illustrating an example of hybrid-SRS to antenna port mapping, according to some embodiments. SRS port 0 has its own dedicated baseband port, SRS port 1 and port 2 are sharing a group of 4 baseband ports and SRS port 3 and port 4 are sharing yet another group of baseband ports. Only hybrid case is illustrated as a generalization of precoded and non-precoded cases.

In this configuration, up to three baseband ports can be jointly precoded, and the SRS transmissions of ports 1&2, as well as ports 3&4, should be multiplexed in time, while SRS port 0 may be transmitted at the same time as any other.

Table 1 below illustrates how the SRS may be jointly transmitted in this example. In each time slot, the ports are considered as possible for combining. Time slot 1 indicates that it is possible to combine 0&1, 0&3, 1&3 and 0&1&3 together. Because (in this example) ports 1&2 are never jointly transmitted, they are considered non-allowed for combining.

TABLE 1

Example of combined SRS transmission order

|  | SRS time slot 1 | SRS time slot 2 | SRS time slot 3 | SRS time slot 4 |
|---|---|---|---|---|
| Jointly Transmitted SRS | Port 0 Port 1 Port 3 | Port 0 Port 2 Port 4 | Port 0 Port 1 Port 4 | Port 0 Port 2 Port 3 |

The SRS transmission is not required to always jointly transmit the maximum number of possible SRSs at each time. Thus, an SRS transmission sequence does not have to be exhaustive. The grouping of which SRS to be transmitted at the same time is specific to the wireless device and can be dynamically arranged. The SRS transmission grouping can follow different prioritization rules and grouping parameters. For example:

The number of simultaneously transmitted SRS.
  Transmitting multiple RS signals requires sharing the total transmit power among them. Wireless devices at the cell-edge should reduce the number of simultaneously transmitted SRS, while wireless devices close to the network node can divide the TX power without coverage issues.
  Complexity: To reduce transmission complexity, a wireless device can choose to transmit a maximum number of SRS port simultaneously even if it can transmit or receiving more streams for data purposes.
Ordering the sequence. Different priority can be given to SRSs, depending on the situations.
  SRS with higher priority can be transmitted first or more frequently (e.g. SRS corresponding to control ports)
  SRS with high gains can be transmitted more often in case of mobility, to cope with channel variations.
  SRS with low gain can be transmitted more often in cell-edge, to increase coverage.

The receiver, in addition to measuring the SRS, establishes a record of which SRS ports are received at the same time, to know which are available for combined transmission.

Figure 3:
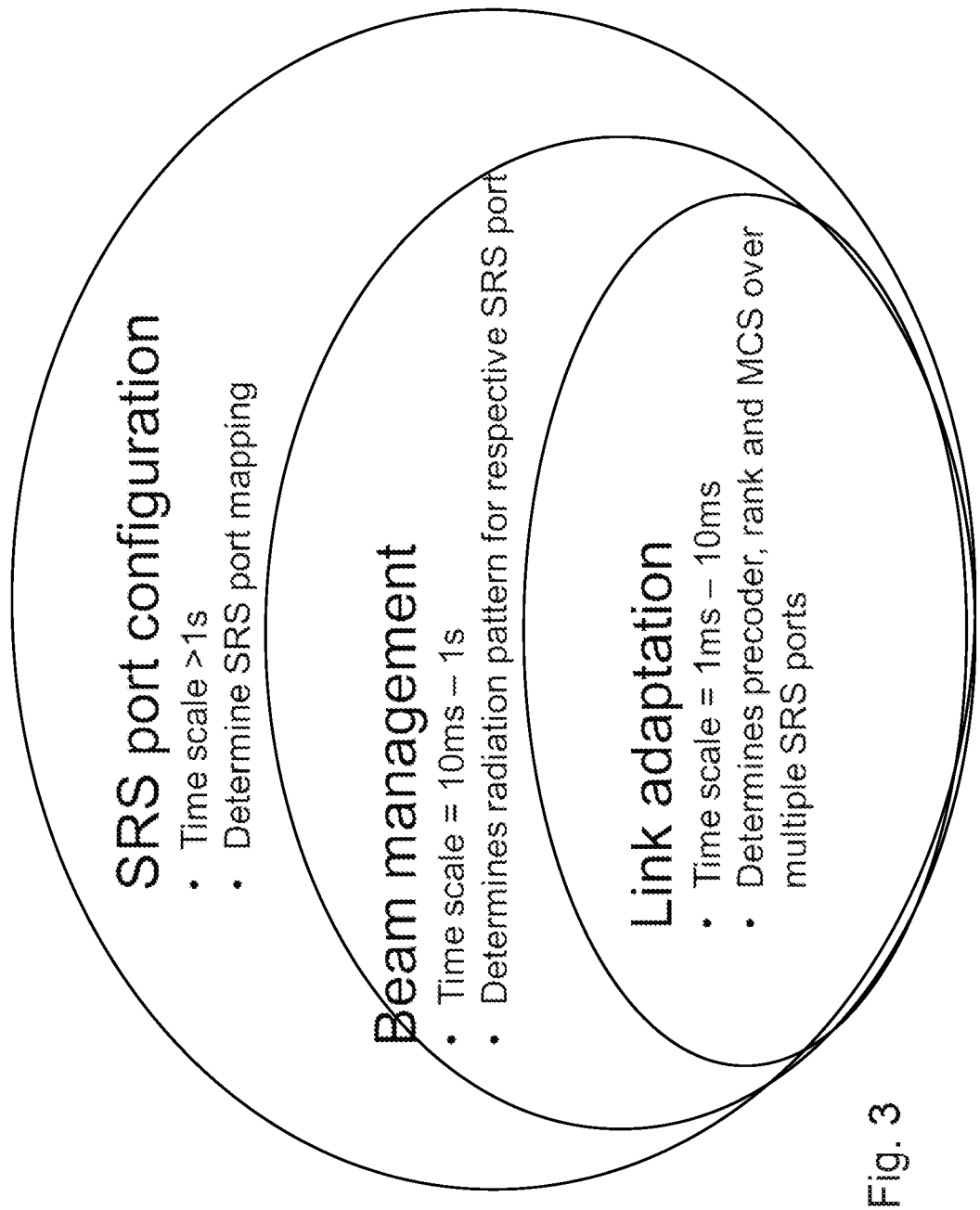
FIG. 3 is a diagram illustrating a general time scale for beamforming management.

In some embodiments, the combining possibilities (or restrictions) are sent directly as additional feedback in an explicit feedback manner. Such information can be (as described in earlier embodiments):

the list of possible port combinations (exhaustive or not); or
the a one-by-one port combining table can be sent from the wireless device to the network node that lists the possible combination arrangements. To reduce the data required by this signaling, the lower triangular matrix can be omitted, as well as the diagonal. Following the example of FIG. 3, such a binary matrix would use a 0 (assuming 0 means restricted) value at the (1,2), (2,1), (3,4) and (4,3) coordinates. To reduce the data required by this signaling, the lower triangular matrix can be omitted, as well as the diagonal. An example binary matrix could look like:

| 1 | 1 | 1 | 1 |
|---|---|---|---|
|   | 0 | 1 | 1 |
|   |   | 1 | 1 |
|   |   |   | 0 |

For example, in the one-to-one combining matrix the first row indicates that port 0 can be combined with any other (but not necessarily with all others).

The feedback may be transmitted using, for example, an uplink control channel such as the Physical Uplink Control Channel (PUCCH), encoded directly on an uplink data channel such as the Physical Uplink Shared Channel (PUSCH), or transmitted on higher layers such as in a MAC CE or RRC message.

The explicit feedback may benefit from being transmitted every time a change in RS to port mapping occurs by the wireless device (when the wireless device is responsible for the RS to port mapping) or the network (when the network is responsible). Additional feedback reports may be triggered, for example, if the network has reason to believe that the encoded feedback report was not correctly decoded.

Figure 7:
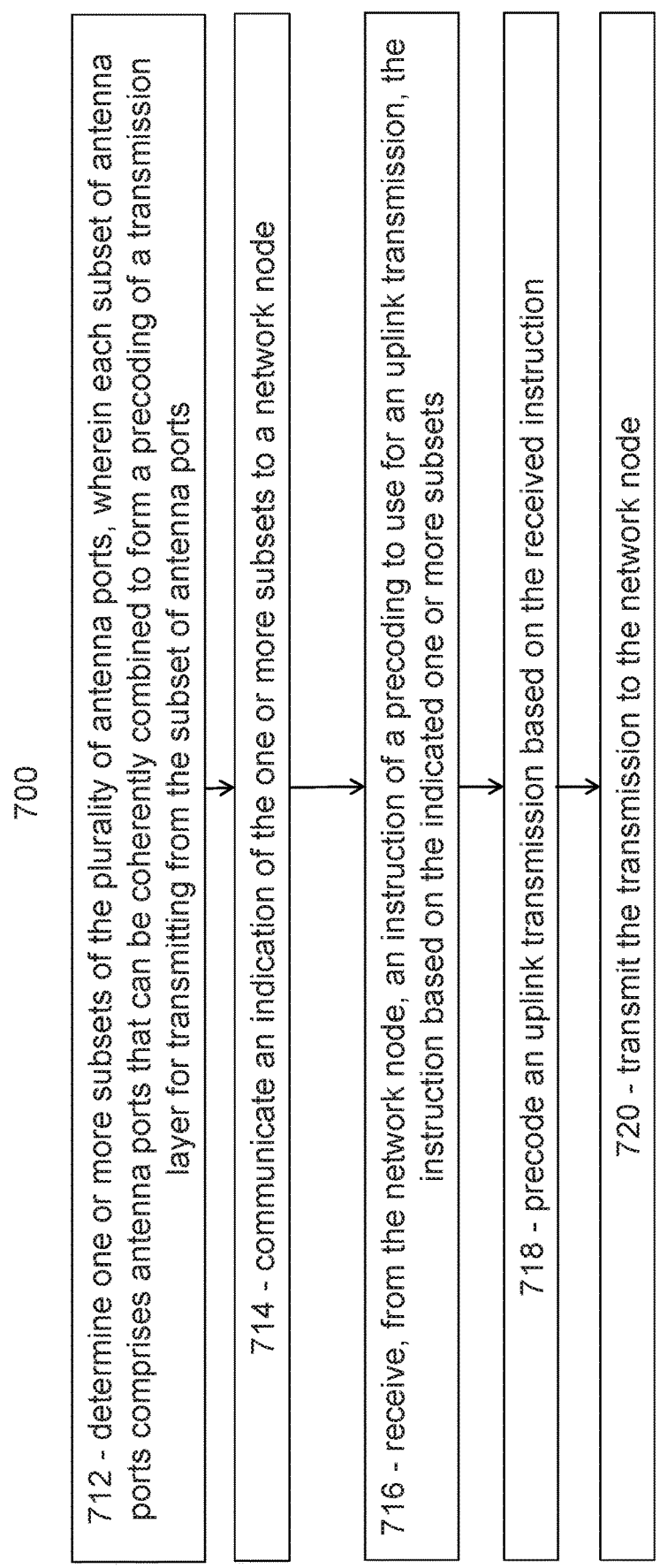
FIG. 7 is a is a flow diagram illustrating an example method in a wireless device of performing an uplink transmission, according to some embodiments.

FIG. 7 is a is a flow diagram illustrating an example method in a wireless device of performing an uplink transmission, according to some embodiments. In particular embodiments, one or more steps may be performed by wireless device 110 of wireless network 100 described with reference to FIG. 4.

The method begins at step 712, where a wireless device determines one or more subsets of the plurality of antenna ports, wherein each subset of antenna ports comprises antenna ports that can be coherently combined to form a precoding of a transmission layer for transmitting from the subset of antenna ports. For example, wireless device 110 may determine the indication according to any of the embodiments described above (e.g., see Table 1).

At step 714, the wireless device communicates an indication of the one or more subsets to a network node. For example, wireless device 110 may communicate the indication to network node 120 using signaling or any of the methods described herein.

In particular embodiments, the indication of the one or more subsets indicates which antenna ports are combinable or which antenna ports are not combinable. The indication of the one or more subsets may indicate allowable precoders of a codebook or unallowable precoders of a codebook.

At step 716, the wireless device receives, from the network node, an instruction or recommendation of a precoding to use for an uplink transmission. The instruction or recommendation is based on the indicated expected power utilization. For example, wireless device 110 may receive a precoding indication from network node 120. The indication may comprise an instruction to use a particular codebook or particular precoding matrix. In some embodiments, wireless device 110 may follow the received instruction or recommendation. In some embodiments, wireless device 100 may modify or ignore the received instruction or recommendation.

At step 718, the wireless device, such as wireless device 110, precodes an uplink transmission based on the received recommendation; and at step 720 the wireless device transmits it to the network node, such as network node 120.

Modifications, additions, or omissions may be made to method 700 illustrated in FIG. 7. Additionally, one or more steps in the method may be performed in parallel or in any suitable order.

Figure 8:
FIG. 8 is a is a flow diagram illustrating an example method in a network node, according to some embodiments.

FIG. 8 is a is a flow diagram illustrating an example method in a network node, according to some embodiments. In particular embodiments, one or more steps may be performed by network node 120 of wireless network 100 described with reference to FIG. 4.

The method begins at step 812, where a network node receives, from a wireless device, an indication of one or more subsets of a plurality of antenna ports. Each subset of antenna ports comprises antenna ports that can be coherently combined to form a precoding of a transmission layer for transmitting from the subset of antenna ports. For example, network node 120 may receive the indication according to any of the embodiments described above (e.g., see Table 1).

In particular embodiments, the indication of the one or more subsets indicates which antenna ports are combinable or which antenna ports are not combinable. The indication of the one or more subsets may indicate allowable precoders of a codebook or unallowable precoders of a codebook.

At step 814, the network node determines a precoding for the wireless device to use for an uplink transmission based on the received indication. For example, network node 120 may determine the precoding according to any of the embodiments described above.

At step 816, the network node sends an instruction to use the determined precoding to the wireless device. For example, network node 120 may send an instruction to wireless device 110. The indication may comprise an instruction to use a particular codebook or particular precoding matrix.

Modifications, additions, or omissions may be made to method 800 illustrated in FIG. 8. Additionally, one or more steps in the method may be performed in parallel or in any suitable order.

Figure 9B:
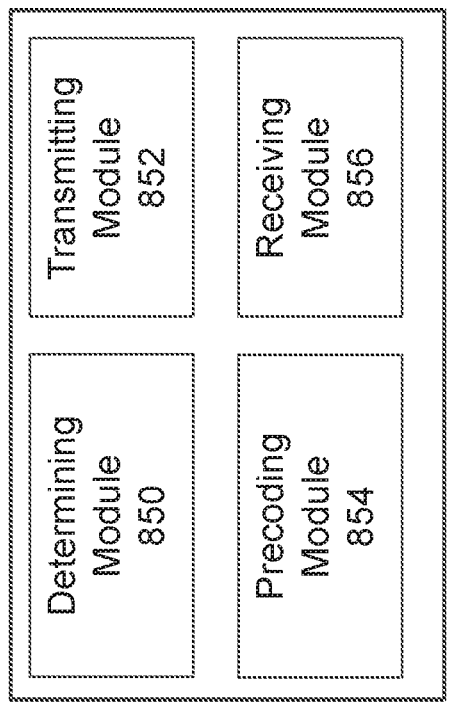
FIG. 9B is a block diagram illustrating example components of a wireless device.
Figure 9A:
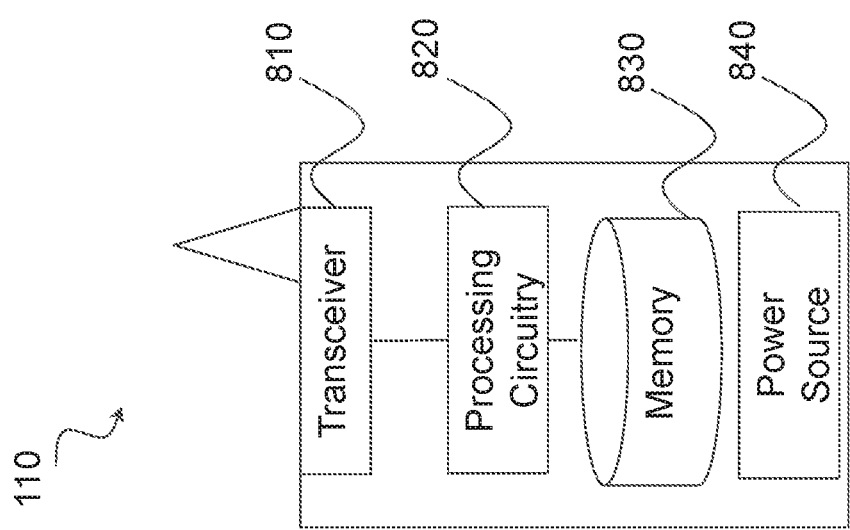
FIG. 9A is a block diagram illustrating an example embodiment of a wireless device.

FIG. 9A is a block diagram illustrating an example embodiment of a wireless device. The wireless device is an example of the wireless devices 110 illustrated in FIG. 4. The wireless device is capable of uplink transmission in a wireless communication network. The wireless device comprises a plurality of antenna ports. The wireless device is capable of determining one or more subsets of the plurality of antenna ports. Each subset of antenna ports comprises antenna ports that can be coherently combined to form a precoding of a transmission layer for transmitting from the subset of antenna ports. The wireless device is capable of communicating an indication of the one or more subsets to a network node, and receiving, from the network node, an instruction of a precoding to use for an uplink transmission. The instruction is based on the indicated one or more subsets. The wireless device is capable of precoding an uplink transmission based on the received instruction, and transmitting the transmission to the network node.

Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a NB-IoT device, or any other device that can provide wireless communication. The wireless device includes transceiver 810, processing circuitry 820, memory 830, and power source 840. In some embodiments, transceiver 810 facilitates transmitting wireless signals to and receiving wireless signals from wireless network node 120 (e.g., via an antenna), processing circuitry 820 executes instructions to provide some or all of the functionality described herein as provided by the wireless device, and memory 830 stores the instructions executed by processing circuitry 820. Power source 840 supplies electrical power to one or more of the components of wireless device 110, such as transceiver 810, processing circuitry 820, and/or memory 830.

Processing circuitry 820 includes any suitable combination of hardware and software implemented in one or more integrated circuits or modules to execute instructions and manipulate data to perform some or all of the described functions of the wireless device. In some embodiments, processing circuitry 820 may include, for example, one or more computers, one more programmable logic devices, one or more central processing units (CPUs), one or more microprocessors, one or more applications, and/or other logic, and/or any suitable combination of the preceding. Processing circuitry 820 may include analog and/or digital circuitry configured to perform some or all of the described functions of wireless device 110. For example, processing circuitry 820 may include resistors, capacitors, inductors, transistors, diodes, and/or any other suitable circuit components.

Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 840 is generally operable to supply electrical power to the components of wireless device 110. Power source 840 may include any suitable type of battery, such as lithium-ion, lithium-air, lithium polymer, nickel cadmium, nickel metal hydride, or any other suitable type of battery for supplying power to a wireless device.

In particular embodiments, processing circuitry 820 in communication with transceiver 810 communicates information about antenna ports for SRS mapping with network node 120. For example, processing circuitry 820 in communication with transceiver 810 may perform any of the steps described with respect to FIGS. 5-8. Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. The components may include determining module 850, transmitting module 852, precoding module 854, and receiving module 856.

Determining module 850 may perform the determining functions of wireless device 110. For example, determining module 850 may perform step 712 described with respect to FIG. 7. In certain embodiments, determining module 850 may include or be included in processing circuitry 820. Determining module 850 may be in communication with transmitting module 852, precoding module 854, and receiving module 856.

Transmitting module 852 may perform the transmitting functions of wireless device 110. For example, transmitting module 852 may perform the steps described with respect to steps 714 and 720 of FIG. 7. In certain embodiments, transmitting module 852 may include or be included in processing circuitry 820. Transmitting module 852 may be in communication with determining module 850, precoding module 854, and receiving module 856.

Precoding module 854 may perform the precoding functions of wireless device 110. For example, precoding module 854 may perform step 718 described with respect to FIG. 7. In certain embodiments, precoding module 854 may include or be included in processing circuitry 820. Precoding module 854 may be in communication with determining module 850, transmitting module 852, and receiving module 856.

Receiving module 856 may perform the receiving functions of wireless device 110. For example, receiving module 856 may perform the steps described with respect to step 716 of FIG. 7. In certain embodiments, receiving module 856 may include or be included in processing circuitry 820. Receiving module 856 may be in communication with determining module 850, precoding module 854, and transmitting module 852.

Figure 10B:
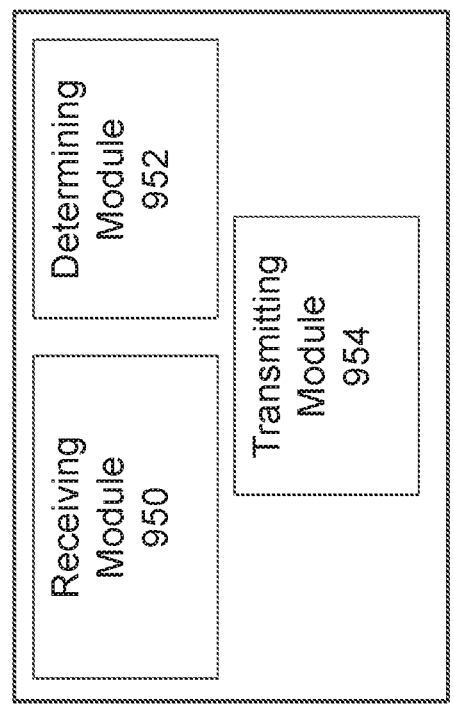
FIG. 10B is a block diagram illustrating example components of a network node.
Figure 10A:
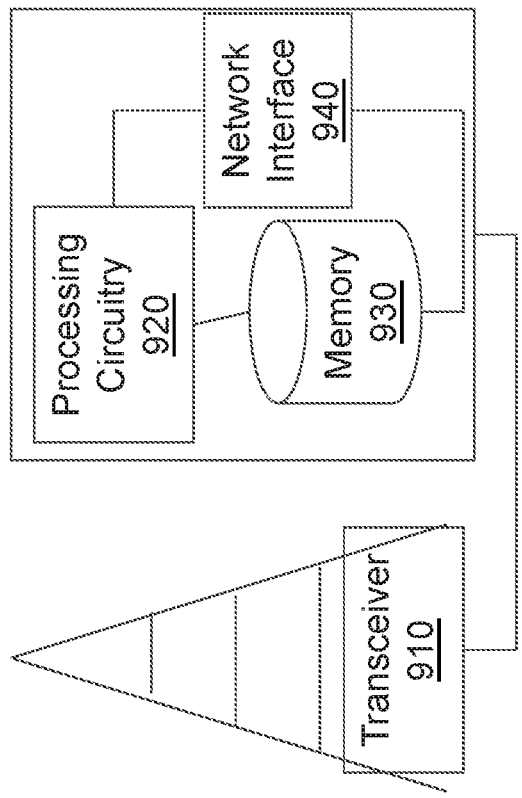
FIG. 10A is a block diagram illustrating an example embodiment of a network node.

FIG. 10A is a block diagram illustrating an example embodiment of a network node. The network node is capable of receiving an uplink transmission in a wireless communication network from a wireless device comprising a plurality of antenna ports. The network node is capable of receiving, from the wireless device, an indication of one or more subsets of the plurality of antenna ports. Each subset of antenna ports comprises antenna ports that can be coherently combined to form a precoding of a transmission layer for transmitting from the subset of antenna ports. The network node is capable of determining a precoding for the wireless device to use for an uplink transmission based on the received indication, and sending an instruction to use the determined precoding to the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes processing circuitry 900. Processing circuitry 900 includes one or more processors 920 (e.g., CPUs, ASICs, FPGAs, etc.), at least one memory 930, at least one network interface 940, and one or more radio units that each include on or more transceivers 910 coupled to one or more antennas. Transceiver 910 facilitates transmitting wireless signals to and receiving wireless signals from a wireless device, such as wireless devices 110 (e.g., via an antenna); processing circuitry 820 executes instructions to provide some or all of the functionality described above as being provided by a network node 120; memory 930 stores the instructions executed by processing circuitry 920; and network interface 940 communicates signals to backend network components, such as a gateway, switch, router, Internet, Public Switched Telephone Network (PSTN), controller, and/or other network nodes 120. Processing circuitry 920 and memory 930 can be of the same types as described with respect to processing circuitry 820 and memory 830 of FIG. 9A above.

In some embodiments, network interface 940 is communicatively coupled to processing circuitry 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network. In particular embodiments, processing circuitry 920 in communication with transceiver 910 receives information about antenna ports for SRS mapping from wireless device 110. For example, processing circuitry 820 in communication with transceiver 810 may perform any of the steps described with respect to FIGS. 5-8.

In some embodiments, a portion of the network node 120 may be implemented as virtual component(s) (e.g., via a virtual machine(s) executing on a physical processing node(s) in a network(s)). For example, some or all of the functions executed by the one or more processors 920 of network node 120 are implemented as virtual components executed by one or more virtual machines implemented in a virtual environment(s) hosted by the one or more processors 920.

Other embodiments of network node 120 include additional components (beyond those shown in FIG. 10A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 10B is a block diagram illustrating example components of a network node 120. The components may include receiving module 950, determining module 952, and transmitting module 954.

Receiving module 950 may perform the receiving functions of network node 120. For example, receiving module 950 may receive information about antenna mapping from wireless device 110, and/or receive reference signals from wireless device 110 according to any of the embodiments described above (e.g., step 812 of FIG. 8). In certain embodiments, receiving module 950 may include or be included in processing circuitry 920. Receiving module 950 may be in communication with determining module 952 and transmitting module 954.

Determining module 952 may perform the determining functions of network node 120. For example, determining module 952 may determine what precoding to apply to a reference signal based on the antenna port information received from wireless device 110 according to any of the embodiments described above (e.g., step 814 of FIG. 8). In certain embodiments, determining module 952 may include or be included in processing circuitry 920. Determining module 952 may be in communication with receiving module 950 and transmitting module 954.

Transmitting module 954 may perform the transmitting functions of network node 120. For example, transmitting module 954 may transmit precoding information to wireless device 110 according to any of the embodiments described above (e.g., step 816 of FIG. 8). In certain embodiments, transmitting module 954 may include or be included in processing circuitry 920. Transmitting module 954 may be in communication with receiving module 950 and determining module 952.

Some embodiments of the disclosure may provide one or more technical advantages. Some embodiments may benefit from some, none, or all of these advantages. Other technical advantages may be readily ascertained by one of ordinary skill in the art.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the spirit and scope of this disclosure.

Abbreviations used in the preceding description include:
3GPP Third Generation Partnership Project
BLER Block Error Rate
BS Base Station
BTS Base Transceiver Station
D2D Device to Device
DL Downlink
eNB eNodeB
eNodeB Evolved Node B
E-UTRA Enhanced UTRA
gNB 5G Node B
LTE Long Term Evolution
M2M Machine to Machine
MBB Mobile Broadband
MIMO Multi-Input Multi-Output
MTC Machine Type Communication
NR New Radio
OFDM Orthogonal Frequency Division Multiplex
PA Power Amplifier
PRB Physical Resource Block
RAN Radio Access Network
RAT Radio Access Technology
RB Resource Block
RNC Radio Network Controller
RRC Radio Resource Control
RRH Remote Radio Head
RRU Remote Radio Unit
RX Receive
SINR Signal to Interference and Noise Ratio
SRS Sounding Reference Signal
TDD Time Division Duplex
TRP Transmission and reception point
TXRU Transmission and Reception Unit
TX Transmit
UE User Equipment
UL Uplink
UMTS Universal Mobile Telecommunications System
UTRA UMTS Terrestrial Radio Access
URLLC Ultra Reliable Low Latency Communication
UTRAN Universal Terrestrial Radio Access Network
V2V Vehicle to Vehicle
V2X Vehicle to Infrastructure
WAN Wireless Access Network

The invention claimed is:

1. A method in a wireless device operable to perform uplink transmission in a wireless communication network, the wireless device comprising a plurality of antenna ports, the method comprising:
   determining one or more subsets of the plurality of antenna ports, wherein each subset of antenna ports comprises antenna ports that are coherently combinable to form a precoding of a transmission layer for transmitting from the subset of antenna ports, and wherein each antenna port is associated with one or more baseband ports and whether a first antenna port is coherently combined with a second antenna port is based on physical properties of the baseband ports associated with the first antenna port and the baseband ports associated with the second antenna port;
   communicating an indication of the one or more subsets to a network node, wherein communicating the indication of the one or more subsets comprising sending, to the network node, a radio resource control (RRC) message that includes the indication;
   receiving, from the network node, an instruction of a precoding to use for an uplink transmission, the instruction based on the indicated one or more subsets;
   precoding an uplink transmission based on the received instruction; and
   transmitting the uplink transmission to the network node.

2. The method of claim 1, wherein the indication of the one or more subsets indicates which antenna ports are combinable.

3. The method of claim 1, wherein the indication of the one or more subsets indicates which antenna ports are not combinable.

4. The method of claim 1, wherein the indication of the one or more subsets indicates allowable precoders of a codebook.

5. The method of claim 1, wherein the indication of the one or more subsets indicates unallowable precoders of a codebook.

6. The method of claim 1, wherein the instruction of the precoding to use for the uplink transmission comprises a codebook selection.

7. A wireless device operable to perform uplink transmission in a wireless communication network, the wireless device comprising a plurality of antenna ports and processing circuitry operable to:
 determine one or more subsets of the plurality of antenna ports, wherein each subset of antenna ports comprises antenna ports that are coherently combinable to form a precoding of a transmission layer for transmitting from the subset of antenna ports, and wherein each antenna port is associated with one or more baseband ports and whether a first antenna port is coherently combined with a second antenna port is based on physical properties of the baseband ports associated with the first antenna port and the baseband ports associated with the second antenna port;
 communicate an indication of the one or more subsets to a network node, wherein the processing circuitry is operable to communicate the indication of the one or more subsets by sending, to the network node, a radio resource control (RRC) message that includes the indication;
 receive, from the network node, an instruction of a precoding to use for an uplink transmission, the instruction based on the indicated one or more subsets;
 precode an uplink transmission based on the received instruction; and
 transmit the uplink transmission to the network node.

8. The wireless device of claim 7, wherein the indication of the one or more subsets indicates which antenna ports are combinable.

9. The wireless device of claim 7, wherein the indication of the one or more subsets indicates which antenna ports are not combinable.

10. The wireless device of claim 7, wherein the indication of the one or more subsets indicates allowable precoders of a codebook.

11. The wireless device of claim 7, wherein the indication of the one or more subsets indicates unallowable precoders of a codebook.

12. The wireless device of claim 7, wherein the instruction of the precoding to use for the uplink transmission comprises a codebook selection.

13. A method in a network node operable to receive an uplink transmission in a wireless communication network from a wireless device comprising a plurality of antenna ports, the method comprising:
 receiving, from the wireless device, an indication of one or more subsets of the plurality of antenna ports, wherein each subset of antenna ports comprises antenna ports that are coherently combinable to form a precoding of a transmission layer for transmitting from the subset of antenna ports, and wherein each antenna port is associated with one or more baseband ports and whether a first antenna port is coherently combined with a second antenna port is based on physical properties of the baseband ports associated with the first antenna port and the baseband ports associated with the second antenna port, wherein receiving the indication comprises receiving a radio resource control (RRC) message;
 determining a precoding for the wireless device to use for an uplink transmission based on the received indication; and
 sending an instruction to use the determined precoding to the wireless device.

14. The method of claim 13, wherein the indication of the one or more subsets indicates which antenna ports are combinable.

15. The method of claim 13, wherein the indication of the one or more subsets indicates which antenna ports are not combinable.

16. The method of claim 13, wherein the indication of the one or more subsets indicates allowable precoders of a codebook.

17. The method of claim 13, wherein the indication of the one or more subsets indicates unallowable precoders of a codebook.

18. The method of claim 13, wherein the instruction to use the precoding for the uplink transmission comprises a codebook selection.

19. A network node operable to receive an uplink transmission in a wireless communication network from a wireless device comprising a plurality of antenna ports, the network node comprising processing circuitry operable to:
 receive, from the wireless device, an indication of one or more subsets of the plurality of antenna ports, wherein each subset of antenna ports comprises antenna ports that are coherently combinable to form a precoding of a transmission layer for transmitting from the subset of antenna ports, and wherein each antenna port is associated with one or more baseband ports and whether a first antenna port is coherently combined with a second antenna port is based on physical properties of the baseband ports associated with the first antenna port and the baseband ports associated with the second antenna port, wherein the processing circuitry is operable to receive the indication by receiving a radio resource control (RRC) message;
 determine a precoding for the wireless device to use for an uplink transmission based on the received indication; and
 send an instruction to use the determined precoding to the wireless device.

20. The network node of claim 19, wherein the indication of the one or more subsets indicates which antenna ports are combinable.

21. The network node of claim 19, wherein the indication of the one or more subsets indicates which antenna ports are not combinable.

22. The network node of claim 19, wherein the indication of the one or more subsets indicates allowable precoders of a codebook.

23. The network node of claim 19, wherein the indication of the one or more subsets indicates unallowable precoders of a codebook.

24. The network node of claim 19, wherein the instruction to use the precoding for the uplink transmission comprises a codebook selection.

* * * * *